United States Patent
Wu et al.

(10) Patent No.: US 12,027,705 B2
(45) Date of Patent: Jul. 2, 2024

(54) DISPERSION METHOD OF SLURRY FOR ALUMINUM BATTERY

(71) Applicant: APh ePower Co., Ltd., Kaohsiung (TW)

(72) Inventors: Jui-Hsuan Wu, Kaohsiung (TW); Shih Po Ta Tsai, Kaohsiung (TW); Wei Chen Huang, Tainan (TW)

(73) Assignee: APh ePower Co., Ltd., Kaohsiung (TW)

( * ) Notice: Subject to any disclaimer, the term of this patent is extended or adjusted under 35 U.S.C. 154(b) by 0 days.

(21) Appl. No.: 17/980,520

(22) Filed: Nov. 3, 2022

(65) Prior Publication Data
US 2023/0197954 A1   Jun. 22, 2023

(30) Foreign Application Priority Data
Dec. 17, 2021   (TW) .................. 110147325

(51) Int. Cl.
| H01B 1/24 | (2006.01) |
| H01M 4/583 | (2010.01) |
| H01M 4/62 | (2006.01) |
| H01M 4/02 | (2006.01) |

(52) U.S. Cl.
CPC ............. *H01M 4/583* (2013.01); *H01B 1/24* (2013.01); *H01M 4/622* (2013.01); *H01M 4/625* (2013.01); *H01M 2004/021* (2013.01)

(58) Field of Classification Search
CPC .. H01B 1/00; H01B 1/24; H01M 4/04; H01M 4/583; H01M 4/622; H01M 4/625
See application file for complete search history.

(56) References Cited

U.S. PATENT DOCUMENTS

| 10,614,966 | B2* | 4/2020 | Gangopadhyay | H01G 11/36 |
| 11,196,039 | B2* | 12/2021 | Sella | H01M 4/362 |
| 11,276,850 | B2* | 3/2022 | Sella | H01M 4/366 |
| 2013/0295454 | A1* | 11/2013 | Huang | H01M 4/625 |
| | | | | 252/511 |
| 2017/0221645 | A1 | 8/2017 | Gangopadhyay et al. | |
| 2018/0212234 | A1* | 7/2018 | Haufe | H01M 4/622 |
| 2019/0229327 | A1* | 7/2019 | Wang | H01M 4/625 |

(Continued)

FOREIGN PATENT DOCUMENTS

| CN | 101207193 | 11/2010 |
| CN | 109546154 | 3/2019 |
| TW | 201827416 | 8/2018 |

OTHER PUBLICATIONS

Cetinkaya et al "Enhancing electrochemical performance of silicon anodes by dispersing MWCNTs using planetary ball milling", Microelectronic Engineering 108 (2013) 169-176.*

(Continued)

*Primary Examiner* — Mark Kopec
(74) *Attorney, Agent, or Firm* — JCIPRNET

(57) ABSTRACT

A dispersion method of slurry for aluminum battery includes at least the following. A first dispersion liquid with active powder and a second dispersion liquid with conductive powder are provided separately, wherein the second dispersion liquid is different from the first dispersion liquid. The first dispersion liquid and the second dispersion liquid are mixed and dispersed by one or more of three-roll rolling, ball milling, centrifugal stirring, and planetary stirring to make a slurry.

6 Claims, 2 Drawing Sheets

(56) References Cited

U.S. PATENT DOCUMENTS

2020/0212401 A1    7/2020  Huang et al.
2021/0126255 A1*   4/2021  Kim ........................ H01M 4/62

OTHER PUBLICATIONS

CN 112011232 (pub date Dec. 2020) English language machine translation.*
CN 113036143 (pub date Jun. 2021) English language machine translation.*
Gu et al "Structure and electrochemical properties of Li4Ti5O12 with Li excess as an anode electrode material for Li-ion batteries", Electrochimica Acta 123 (2014) 576-581.*
"Search Report of Europe Counterpart Application", issued on Mar. 1, 2024, p. 1-p. 9.

* cited by examiner

DISPERSION METHOD OF SLURRY FOR ALUMINUM BATTERY

CROSS-REFERENCE TO RELATED APPLICATION

This application claims the priority benefit of Taiwan application serial no. 110147325, filed on Dec. 17, 2021. The entirety of the above-mentioned patent application is hereby incorporated by reference herein and made a part of this specification.

BACKGROUND

Technical Field

The disclosure relates to a dispersion method of slurry. More particularly, the disclosure relates to a dispersion method of slurry for aluminum battery.

Description of Related Art

Generally speaking, the electrode of an aluminum battery is usually made by coating the metal substrate with slurry. However, due to the solid composition (e.g., active powder or conductive powder) in the slurry, it often has the characteristics of high specific surface area and high structure. Therefore, the current method of adding various solid compositions, such as the aforementioned active powder and conductive powder, into the solvent to make the dispersion liquid at one time makes the solid composition in the dispersion liquid easily gather into clumps and make it difficult to make a uniformly dispersed slurry, which reduces the performance of the aluminum battery.

SUMMARY

The disclosure provides a dispersion method of slurry for aluminum battery, which makes a slurry with a uniform dispersion, thereby improving the performance of the aluminum battery.

The dispersion method of slurry for aluminum battery of the disclosure includes at least the following. A first dispersion liquid with active powder and a second dispersion liquid with conductive powder are provided separately, and the second dispersion liquid is different from the first dispersion liquid. The first dispersion liquid and the second dispersion liquid are mixed and dispersed by one or more of three-roll rolling, ball milling, centrifugal stirring, and planetary stirring to make a slurry.

In an embodiment of the disclosure, the first dispersion liquid is prepared by adding the active powder and a first adhesive into a first solvent and dispersed by one or more of three-roll rolling, ball milling, centrifugal stirring, and planetary stirring.

In an embodiment of the disclosure, the active powder and the first adhesive are added to the first solvent at one or more times.

In an embodiment of the disclosure, the second dispersion liquid is prepared by adding the conductive powder and a second adhesive into a second solvent and dispersed by one or more of three-roll rolling, ball milling, centrifugal stirring, and planetary stirring.

In an embodiment of the disclosure, the conductive powder and the second adhesive are added to the second solvent at one or more times.

In an embodiment of the disclosure, the active powder and the conductive powder are not metal powders.

In an embodiment of the disclosure, the active powder includes activated carbon, conductive carbon black (Super P), carbon nanotubes, multi-layer graphene, monolayer graphene, or a combination thereof, and the conductive powder includes activated carbon, conductive carbon black, carbon nanotubes, multi-layer graphene, monolayer graphene, or a combination thereof.

In an embodiment of the disclosure, a proportion of the active powder in the slurry is 30 wt % to 70 wt %.

In an embodiment of the disclosure, a proportion of the conductive powder in the slurry is 2.5 wt % to 15 wt %.

In an embodiment of the disclosure, a particle size of the active powder ranges from 10 nanometers to 300 microns, and a particle size of the conductive powder ranges from 10 nanometers to 300 microns.

Based on the above, in the disclosure, dispersion liquids corresponding to different solid compositions are first prepared, and then the dispersion liquids are mixed and dispersed by one or more of three-roll rolling, ball milling, centrifugal stirring, and planetary stirring to make a slurry. In this way, the design and combination of different dispersion processes may effectively improve the uneven dispersion of the slurry, slow down the problem of sediment separation of the solid composition, increase the conductivity of the electrode (positive or negative), and maintain the high lifetime of the battery even at high charging and discharging rates. Therefore, a slurry with a uniform dispersion may be made by the dispersion method of slurry for aluminum battery of the disclosure, thereby improving the performance of the aluminum battery.

In order to make the above-mentioned features and advantages of the disclosure comprehensible, embodiments accompanied with drawings are described in detail below.

DESCRIPTION OF THE EMBODIMENTS

In order to make the content of the disclosure easier to understand, the following specific embodiments are illustrated as examples of the actual implementation of the disclosure. For clear description, many practical details will be described together in the following description. However, it should be understood that these practical details should not be used to limit the disclosure. That is, in some embodiments of the disclosure, these practical details are optional.

Unless otherwise defined, all terms (including technical and scientific terms) used herein have the same meaning as that commonly understood by one of ordinary skill in the art to which this disclosure belongs.

The terms "first", "second", "third" and similar terms in the specification and in the claims, if any, are used to distinguish and not necessarily to describe a particular sequence or chronological order. It is understood that the terms so used may be interchanged where appropriate, so that the embodiments described herein may, for example, operate in a different sequence than that revealed herein or as described herein. Similarly, assuming that a method herein is described as including a series of steps, the order of such steps presented herein is not necessarily the only order in which such steps may be performed. Particular steps in the stated steps may be omitted and/or other particular steps not described herein may be added to the method.

Figure 1:
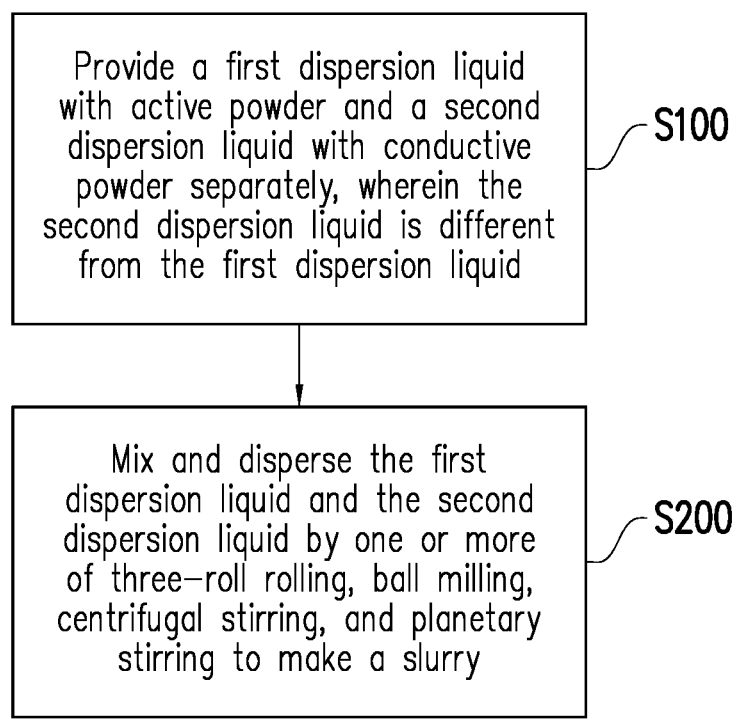
FIG. 1 is a schematic flow chart of a dispersion method of slurry for aluminum battery according to an embodiment of the disclosure.
Figure 2:
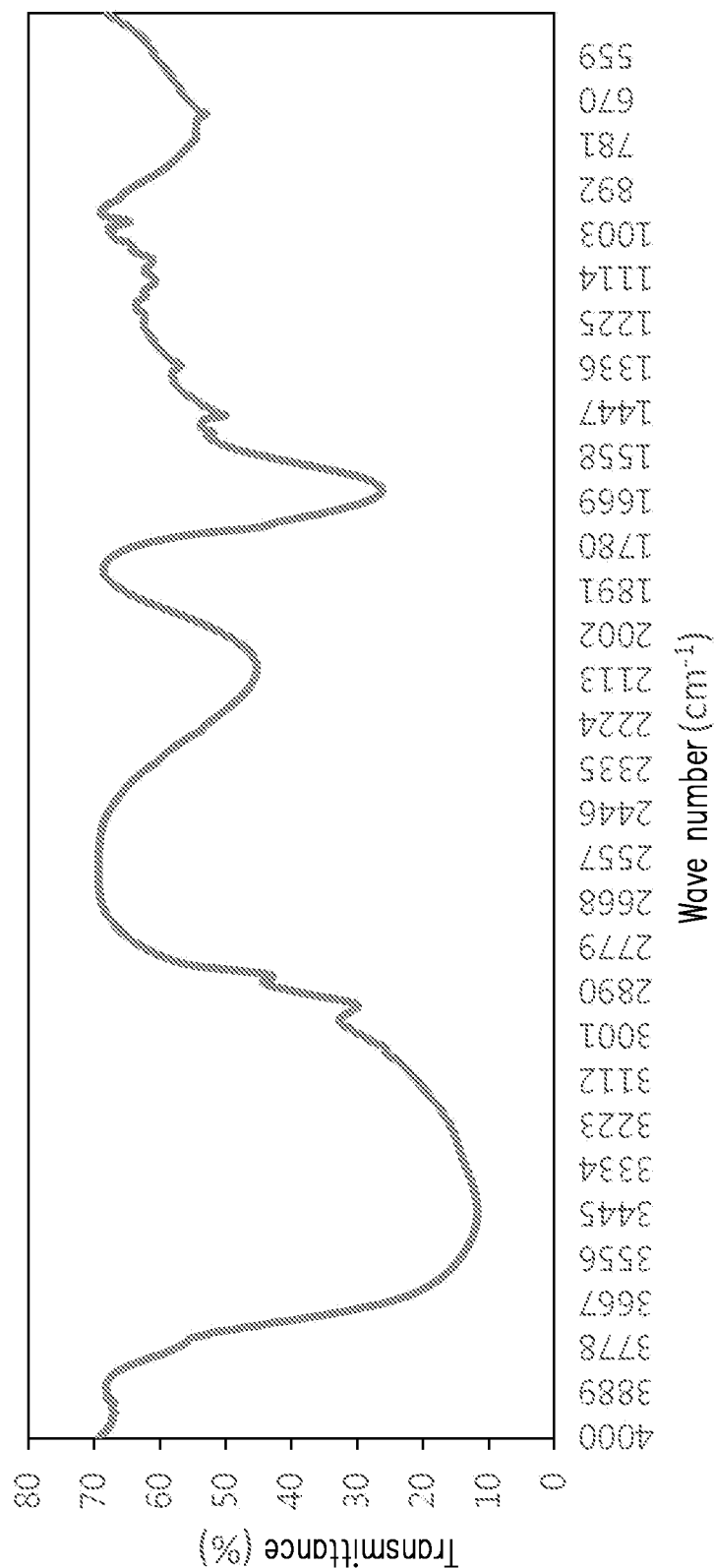
FIG. 2 is a graph of Fourier transform infrared spectroscopy (FTIR) data according to an embodiment of the disclosure.

FIG. 1 is a schematic flow chart of a dispersion method of slurry for aluminum battery according to an embodiment of the disclosure. FIG. 2 is a graph of Fourier transform infrared spectroscopy (FTIR) data according to an embodiment of the disclosure. Referring to FIG. 1 and FIG. 2, first, a first dispersion liquid with active powder and a second dispersion liquid with conductive powder are provided separately, where the second dispersion liquid is different from the first dispersion liquid (step S100). Hereby, since the first dispersion liquid with the active powder and the second dispersion liquid with the conductive powder are dispersion liquids made by different dispersion processes rather than the dispersion liquid made at one time as in the prior art, the second dispersion liquid may be regarded as different from the first dispersion liquid.

Next, the first dispersion liquid and the second dispersion liquid are mixed and dispersed by one or more of three-roll rolling, ball milling, centrifugal stirring, and planetary stirring to make a slurry (step S200). Accordingly, in this embodiment, dispersion liquids corresponding to different solid compositions are first prepared, and then the dispersion liquids are mixed and dispersed by one or more of three-roll rolling, ball milling, centrifugal stirring, and planetary stirring to make a slurry. In this way, the design and combination of different dispersion processes may effectively improve the uneven dispersion of the slurry, slow down the problem of sediment separation of the solid composition, increase the conductivity of the electrode (positive or negative), and maintain the high lifetime of the battery even at high charging and discharging rates. Therefore, a slurry with a uniform dispersion may be made by the dispersion method of slurry for aluminum battery of this embodiment, thereby improving the performance of the aluminum battery.

For example, the fineness of the slurry after dispersion may reach 2 to 3 times the median value (D50) of the particle size distribution of the solid powder before dispersion. Furthermore, the conductivity of the electrodes may be increased by 50% to 70% under the same conditions compared with the slurry using the prior art (dispersion liquid made at one time). In addition, when polyethylene terephthalate (PET) or other suitable materials are used as the base material, the resistance may reach 0.7 ohms ($\Omega$) to 1.0 ohms, and the result shown in FIG. 2 shows strong absorption peaks at 1634 $cm^{-1}$, 2084 $cm^{-1}$, and 3434 $cm^{-1}$, respectively, but the disclosure is not limited thereto.

Furthermore, the device structures used in the dispersion process of the slurry of the prior art are more complicated and the operation is not easy (e.g., a DC motor mixer, a planetary rotary mixer). In the mixing process of the slurry dispersion device, single particles and aggregated particles of the slurry tend to gather and settle at the bottom of the container, and create blind spots at the corners of the container and, so some of the single particles or aggregated particles of the slurry is unable to be dispersed. At the same time, the slurry also tends to have larger aggregated particles, and the particle size of the aggregated particles of the slurry is distributed in a wider range. In addition, after the slurry has been standing for a period of time, the viscosity, the particle size, or the state of the surface of the slurry varies greatly compared with the viscosity, particle size, or surface state of the slurry at the initial time. Therefore, the design and combination of different dispersion processes using this embodiment and the selection of dispersion devices such as three-roll rolling, ball milling, centrifugal stirring, and planetary stirring may effectively improve the above problems.

In some embodiments, the first dispersion liquid is prepared by adding the active powder and a first adhesive into a first solvent and dispersed by one or more of three-roll rolling, ball milling, centrifugal stirring, and planetary stirring. Hereby, the active powder may include activated carbon, conductive carbon black (Super P), carbon nanotubes, multi-layer graphene, monolayer graphene, or a combination thereof; the first adhesive may include polyvinylidene difluoride (PVDF), acrylic acid resin, carboxymethyl cellulose (CMC), styrene-butadiene rubber (SBR), or a combination thereof; and the first solvent may include water, alcohol, ethylene glycol, toluene, terpineol, terpineyl acetate, N-Methyl-2-pyrrolidone (NMP) or a combination thereof, but the disclosure is not limited thereto.

Furthermore, the organic coating adhesive solution may be prepared by dissolving one or more of the first adhesives (organic adhesives) in the first solvent, and then adding the active powder to the organic coating adhesive solution as described above and dispersing the same by one or more of three-roll rolling, ball milling, centrifugal stirring, and planetary stirring to prepare the first dispersion liquid. The active powder and the first adhesive are added to the first solvent at one (continuously) or more times (not continuously), but the disclosure is not limited thereto.

In some embodiments, the second dispersion liquid is prepared by adding the conductive powder and a second adhesive into a second solvent and dispersed by one or more of three-roll rolling, ball milling, centrifugal stirring, and planetary stirring. Hereby, the conductive powder may include activated carbon, conductive carbon black, carbon nanotubes, multi-layer graphene, monolayer graphene, or a combination thereof; the second adhesive may include polyvinylidene difluoride, acrylic acid resin, carboxymethyl cellulose, styrene-butadiene rubber, or a combination thereof; and the second solvent may include water, alcohol, ethylene glycol, toluene, terpineol, terpineyl acetate, N-Methyl-2-pyrrolidone or a combination thereof, but the disclosure is not limited thereto.

Furthermore, the organic coating adhesive solution may be prepared by dissolving one or more of the second adhesives (organic adhesives) in the second solvent, and then adding the conductive powder to the organic coating adhesive solution as described above and dispersing the same by one or more of three-roll rolling, ball milling, centrifugal stirring, and planetary stirring to prepare the second dispersion liquid. The conductive powder and the second adhesive are added to the second solvent at one (continuously) or more times (not continuously), but the disclosure is not limited thereto. In addition, the active powder and the conductive powder may be the same or different; the first adhesive and the second adhesive may be the same or different; and the first solvent and the second solvent may be the same or different.

In some embodiments, the active powder is activated carbon and the dispersion method of ball milling is used to prepare the first dispersion liquid; the conductive powder is carbon black and the dispersion methods of planetary stirring and three-roll rolling are used to prepare the second dispersion liquid; and the dispersion method of planetary stirring is used to mix the first dispersion liquid and the second dispersion liquid, but the disclosure is not limited thereto.

It should be noted that the aforementioned various compositions may be aluminum battery compositions that obtained by persons skilled in the art according to any content included in the spirit and scope of the appended claims. The aforementioned dispersion methods of three-roll rolling, ball milling, centrifugal stirring, and planetary stirring may also be selected according to the actual use of active powder and conductive powder, which is not limited in the disclosure.

In some embodiments of the disclosure, the active powder and the conductive powder are not metal powders, but the disclosure is not limited thereto.

In some embodiments, the proportion of the active powder in the slurry is 30 wt % to 70 wt % (e.g., 30 wt %, 40 wt %, 50 wt %, 60 wt %, 70 wt %, or any value within the aforementioned 30 wt % to 70 wt %). The proportion of the conductive powder in the slurry is 2.5 wt % to 15 wt % (e.g., 2.5 wt %, 5 wt %, 8 wt %, 10 wt %, 15 wt %, or any value within the aforementioned 2.5 wt % to 15 wt %). The proportion of the sum of the first adhesive and the second adhesive in the slurry is 3 wt % to 10 wt % (e.g., 3 wt %, 5 wt %, 8 wt %, 10 wt %, or any value within the aforementioned 3 wt % to 10 wt %). The proportion of the sum of the first solvent and the second solvent in the slurry is 20 wt % to 70 wt % (e.g., 20 wt %, 30 wt %, 40 wt %, 50 wt %, 60 wt %, 70 wt %, or any value within the aforementioned 20 wt % to 70 wt %). However, the disclosure is not limited to this, and the proportion of the aforementioned compositions may be adjusted according to the actual design requirements.

In some embodiments, the particle size of the active powder ranges from 10 nanometers (nm) to 300 microns (μm), and the particle size of the conductive powder ranges from 10 nanometers to 300 microns. Therefore, using the design and combination of different dispersion processes of this embodiment and making selection from different dispersion devices such as three-roll rolling, ball milling, centrifugal stirring, and planetary stirring may effectively improve the problem of aggregation that occurs easily when the solid powder reaches the micron or even nanometer level. Moreover, there are also other problems such as agglomerating into large particles during the storage or transportation process, so that the physical properties (e.g., viscosity, surface state, or the particle size distribution) of the slurry change and deviate from the initial uniform dispersion state, resulting in problems such as variation in subsequent applications, but the disclosure is not limited to this.

It should be noted that the unexplained composition (e.g., separator, electrolyte solution, etc.) and specification of the aluminum battery should be obtained by persons skilled in the art according to any content included in the spirit and scope of the appended claims.

To sum up, in the disclosure, dispersion liquids corresponding to different solid compositions are first prepared, and then the dispersion liquids are mixed and dispersed by one or more of three-roll rolling, ball milling, centrifugal stirring, and planetary stirring to make a slurry. In this way, the design and combination of different dispersion processes may effectively improve the uneven dispersion of the slurry, slow down the problem of sediment separation of the solid composition, increase the conductivity of the electrode (positive or negative), and maintain the high lifetime of the battery even at high charging and discharging rates. Therefore, a slurry with a uniform dispersion may be made by the dispersion method of slurry for aluminum battery of the disclosure, thereby improving the performance of the aluminum battery.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A dispersion method of slurry for aluminum battery, comprising:
    providing a first dispersion liquid with active powder and a second dispersion liquid with conductive powder separately, wherein the second dispersion liquid is different from the first dispersion liquid, wherein the active powder comprises activated carbon, conductive carbon black, carbon nanotubes, multi-layer graphene, monolayer graphene, or a combination thereof, and the conductive powder comprises activated carbon, conductive carbon black, carbon nanotubes, multi-layer graphene, monolayer graphene, or a combination thereof; and
    mixing and dispersing the first dispersion liquid and the second dispersion liquid by one or more of three-roll rolling, ball milling, centrifugal stirring, and planetary stirring to make a slurry,
    wherein a proportion of the active powder in the slurry is 30 wt % to 70 wt % and a proportion of the conductive powder in the slurry is 2.5 wt % to 15 wt %.

2. The dispersion method according to claim 1, wherein a dispersion process of the first dispersion liquid comprises adding the active powder and a first adhesive into a first solvent and dispersed by one or more of three-roll rolling, ball milling, centrifugal stirring, and planetary stirring.

3. The dispersion method according to claim 2, wherein the active powder and the first adhesive are added to the first solvent at one or more times.

4. The dispersion method according to claim 1, wherein a dispersion process of the second dispersion liquid comprises adding the conductive powder and a second adhesive into a second solvent and dispersed by one or more of three-roll rolling, ball milling, centrifugal stirring, and planetary stirring.

5. The dispersion method according to claim 4, wherein the conductive powder and the second adhesive are added to the second solvent at one or more times.

6. The dispersion method according to claim 1, wherein a particle size of the active powder ranges from 10 nanometers to 300 microns, and a particle size of the conductive powder ranges from 10 nanometers to 300 microns.

* * * * *